United States Patent Office 3,130,808
Patented Apr. 28, 1964

3,130,808
ACOUSTICAL WELL FLUID LOGGING
Hugh O. Walker, Jr., Houston, and Robert J. Loofbourrow, Bellaire, Tex., assignors to Texaco Inc., New York, N.Y., a corporation of Delaware
Filed Sept. 26, 1960, Ser. No. 60,248
13 Claims. (Cl. 181—.5)

This invention relates to oil well production and more particularly to a method and apparatus for logging the fluids contained in a borehole traversing subsurface formations.

This application is a continuation-in-part of application Serial No. 629,655, filed December 20, 1956, now abandoned.

In a pumping well, it is advantageous to know both the top and bottom levels of the column of oil in the well for optimum pumping action. It is also advantageous to know the rate at which oil is replaced in the well when it is pumped at a given rate. One way to determine the replacement rate would be to periodically determine the air-oil interface and the oil-water interface in the well. It is well known to use a well sounder to locate the air-oil interface but well sounders are not suitable for determining the location of the oil-water interface in a pumping well. Furthermore, when an emulsion or mixture of oil and water is present in a borehole it is often desirable to know the ratio of the oil and water.

Accordingly, it is an object of this invention to provide a log of the fluids contained in a borehole.

It is another object of this invention to provide a method and apparatus for determining the interface between two fluids, for example, oil and water, in the bore of a pumping well.

It is still another object of this invention to determine the ratio of oil and water when an emulsion or mixture thereof is present in a borehole.

In accordance with this invention a log of the fluids in a borehole or well is provided by measuring the acoustic velocity in the borehole fluids.

In carrying out the invention a tool or sonde of an acoustical velocity logging system is passed through fluids in the bore of the well. The system includes a transmitting transducer and a receiving transducer spaced from each other at a fixed distance. The transducers may include crystals which are disposed in the housing of the tool which is connected to the lower end of a cable adapted to support the housing and components contained therewithin and to transmit a signal indicative of the acoustic velocities in the well fluids to an indicating device. Thus, when the tool moves through a well containing fluids having different acoustic properties, such as water and oil, the indicating device will indicate corresponding changes in acoustic velocity which will identify the well or borehole fluids.

Figure 1:
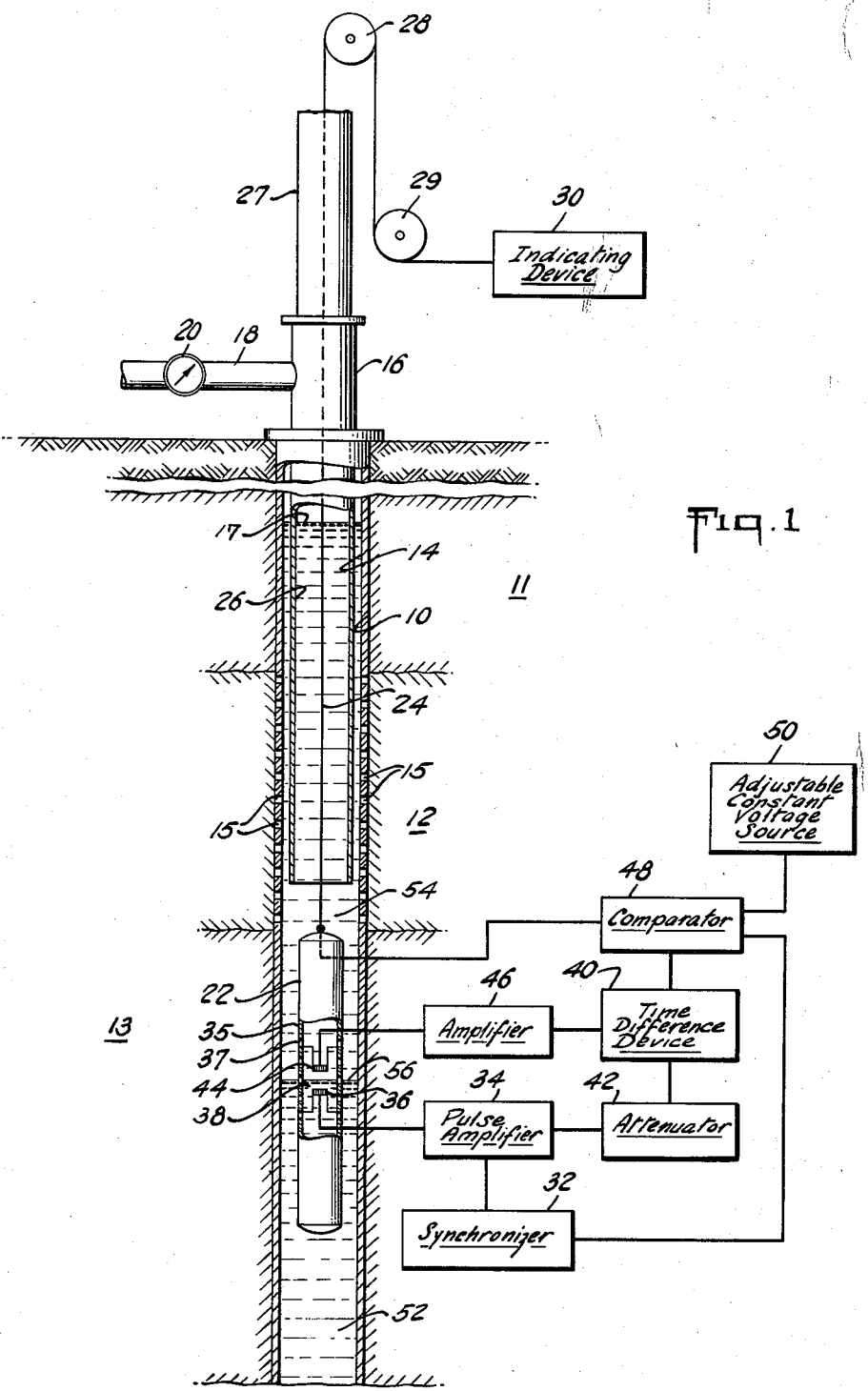
Figure 2:
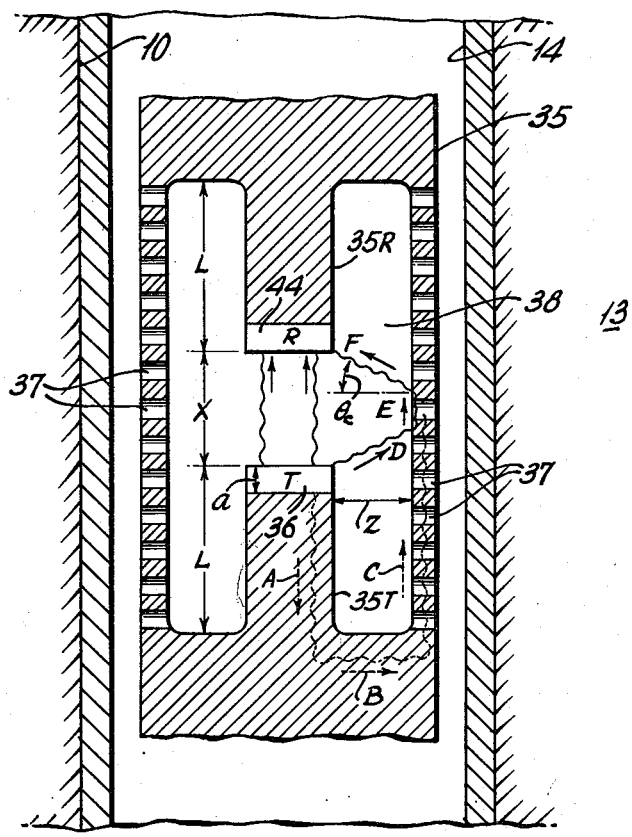

For a better understanding of the invention reference may be had to the accompanying drawing in which:

FIGURE 1 is a vertical sectional view through a portion of the borehole showing an acoustical logging system including a block diagram of the electrical circuitry thereof in accordance with the invention; and FIGURE 2 is a detailed view of a portion of the logging system shown in FIGURE 1.

Referring to FIGURE 1 of the drawing, a borehole or well 10 is shown penetrating a plurality of different formations 11, 12, 13 including an oil producing formation 12. The well 10 has a casing 14 having perforations 15 in the portion thereof adjacent to the formation 12 and a well head 16 from which extends an outflow pipe 18 containing a suitable flow meter 20. Shown suspended within the borehole 10 below the air-oil interface 17 is a tool or sonde of the logging system indicated generally by an elongated housing 22. The tool is suspended from a conductor cable 24 which passes through production tubing 26 and a suitable well head lubricator 27 and over a pulley 28 and a cable-measuring drum or reel 29 which serves to indicate or measure the amount of cable payed out and thereby the location of the tool 22 in the borehole 10. The upper end of the cable is connected to a suitable indicating device 30, for example, a meter, oscilloscope or a recorder of the permanent type.

Within the tool housing 22 is a synchronizer 32 connected to a pulse amplifier 34 which applies electrical pulses at a predetermined rate to a first transducer element, for example, a transmitter crystal 36, which, in turn, produces acoustic or elastic pulses or waves having, preferably, ultrasonic frequencies, which travel through an opening or chamber 38 of the housing 22 filled with well fluid to a second transducer element, for example, a receiver crystal 44. The chamber 38 may be defined by a housing portion 35 having perforations 37 which may be suitably acoustically insulated from the crystals 36 and 44. The receiver and transmitter crystals 36 and 44 are disposed in the chamber 38 of the tool housing 22 at a fixed distance from each other, preferably a distance less than one foot. The transducer elements 36 and 44 have lateral dimensions which are small compared with the borehole diameter and they are spaced apart from each other a distance such that the travel time of an acoustic pulse between them through any fluid logged in the borehole is less than the shortest travel time of a refracted wave in the walls of the borehole 10, tool 22 or casing 14, as described in greater detail below with reference to FIGURE 2. The acoustic pulses detected by the receiver crystal 44 are converted therein to electric pulses which are applied to the time difference device 40 through amplifier 46. Pulse amplifier 34 also applies pulses to the time difference device 40 through an attenuator 42. At each location of the tool in the well 10 an output voltage from the time difference device 40 is produced which has a magnitude proportional to the time lapse between the application thereto of successive pulses from amplifiers 34 and 46 and which is therefore also proportional to the time required for an acoustic pulse generated by the transmitter crystal 36 to travel in a direct path from the transmitter crystal 36 through the fluid in the opening or chamber 38 of the housing 22 to the receiver crystal 44. Since velocity is equal to distance divided by time and since the distance between the crystals 36 and 44 is fixed and constant, the voltage proportional to time is also an indication of the acoustic velocity in the medium between the crystals 36 and 44. The output voltage from the time difference device 40 is applied to a comparator 48 and compared therein with a reference voltage applied to comparator 48 from an adjustable constant voltage source 50. The comparator 48 can be adapted to produce an output voltage only when a voltage applied to the comparator 48 from the time difference device 40 represents an acoustic velocity less than the value corresponding to that of water, by providing a reference voltage equal to that corresponding to water. However, if desired, the reference voltage may be adjusted to a greater value than that corresponding to water whereby a center meter reading on indicating device 30 would represent a particular ratio of water and oil in an emulsion. The reference voltage having a value indicative of acoustic velocity in water or in a particular emulsion is produced simply by making a proper adjustment in the adjustable constant voltage source 50. A synchronizing pulse from synchronizer 32 is applied to the comparator 48 which may include suitable delay means to render the comparator operative periodically for only that portion of time during which a time difference pulse from time difference device 40 is expected.

The extent of variation in acoustic velocity in different fluids can be seen from the following table.

| Fluid | Velocity in Meters Per Second at 25° C. | Change in Velocity in Meters Per Second Per ° C. |
|---|---|---|
| Sea water | 1,531 | +2.4 |
| Distilled water | 1,498 | +2.4 |
| Kerosene | 1,324 | −3.6 |
| Octane | 1,171 | −4.2 |
| Heptane | 1,135 | −4.2 |

In the bore of a well at bottom hole temperatures such as 75° C. there will be a 50° C. increase over the values of temperatures used in the above table. Thus, salt water will have a velocity change of (50)(+2.4) or 120 meters per second and therefore a velocity of 1531+120 or 1651 meters per second at 75° C.; whereas, octane will have a velocity change of (50)(−4.2) or −210 meters per second and therefore a velocity of 1171−210 or 960 meters per second at 75° C. The difference in velocity between the salt water and the octane at 75° C. would be from 1651 to 960 meters per second or 691 meters per second which is 42 percent decrease in velocity from salt water to octane. The temperature increase in the well serves to increase the percent change since at the surface, that is at 25° C., a change in velocity of only 360 meters per second or 23½ percent would be noted.

When the tool 22 is lowered into the borehole 10 and the opening or chamber 38 of the instrument housing 22 is filled with the borehole fluid a properly calibrated scale in indicating device 30 can provide direct velocity readings. The velocity in water, as at 52, being different from the velocity in the oil, as at 54, one can by this means determine the presence of oil 54 or water 52 by measurement of the velocity at points in the borehole. If an interface exists, as at 56, there will be a sharp change in velocity when the device is moved from a position located in water 52 to a position in oil 54 or vice versa.

The velocity in a mixture of water and oil is proportional to the oil and water ratio so that if an interface is not present for some reason and only an emulsion exists, the oil-water ratio of the emulsion could be determined since it is proportional to the velocity of the mixture or emulsion. If an interface exists between water and an emulsion of oil and water, this could also be detected because the velocity in the water and in the emulsion would differ.

Although the drawing shows the tool 22 and cable 24 passing through the inside of the tubing 26 it should be understood that the instrument 22 can be designed and adapted to be lowered through the well bore in the annulus between the tubing 26 and the casing 14. It should also be understood that when the tool 22 is lowered through the tubing 26 or through the annulus between the tubing 26 and the casing 14 acoustic signals refracted through the adjacent formation, tubing or casing have a lower energy value and therefore can be discriminated against on an amplitude basis. Furthermore, it should be realized that all the electronic circuits, preferably with the exception of the indicating device 30, can be located in the sonde or tool whereby a single conductor cable can be connected to the sonde or the circuitry can be located at the surface whereby a multi-conductor cable can be used.

The operation of the logging instrument shown in FIG. 1 may be better appreciated by referring now to FIG. 2 wherein the transmitter and receiver transducers 36, 44 are illustrated in greater detail along with diagrammatic representations of various acoustic paths from the transmitter transducer 36 to the receiver transducer 44. This logging system is designed so that the first pulse to reach the receiver transducer 44 from the transmitter transducer 36 is one which has passed through the well fluid in the instrument to the exclusion of the adjacent earth formation as well as the housing portion 35 of the logging instrument. This involves a proper choice of dimensions for the logging instrument so that the direct path travel time over the distance X from the transmitter 36 to the receiver 44 through the well fluid in the chamber of the instrument is shorter than the travel time of other possible significant travel paths within or outside of the logging instrument. Any path through the adjacent earth formation will be longer than the path through the sonde housing 35 and therefore the formation paths need not be considered in detail. Apart from the direct path, there are two travel paths of primary consideration within the logging instrument. These two paths are a first path designated A, B, C, F in FIG. 2 of the drawing and a second path designated D, E, F in FIG. 2 of the drawing.

The first path A, B, C, F includes the vertical support portion of the housing to which the transmitting transducer 36 is attached, the horizontal portion of the housing from the base of the support portion 35T to the outer wall of the instrument housing 35, a portion of the outer wall 35 from the juncture of said horizontal portion and the outer wall to a point between the transmitter and receiver transducers 36, 44 and then through the well fluid in the chamber of the logging instrument to the receiver transducer 44.

The second path D, E, F leads from the transmitter transducer 36 through the well fluid in the chamber of the logging instrument to the outer wall of the instrument thence upward through a short portion of the outer wall 35 generally between the transmitter and receiver transducers 36, 44 and back from the outer wall 35 through the well fluid in the chamber to the receiver transducer 44.

The relationship of the various acoustic travel paths between the transmitter and receiver transducers may be advantageously considered in mathematical terms.

Let the travel time for the direct path be expressed as $T_{direct}$.

*Equation 1*

$$T_{direct} = \frac{X}{V_f}$$

where $X$ = distance separating the transmitter and receiver,
$V_f$ = acoustic velocity in well fluid.

Let the travel time for the first path ABCF be expressed as $T_{ABCF}$.

*Equation 2*

$$T_{ABCF} = \frac{L-a}{V_s} + \frac{Z}{V_s} \frac{L+(X-Z \tan \theta_c)}{V_s} + \frac{Z}{V_f \cos \theta_c} *$$

where $a$ = vertical dimension of transmitter transducer
$L$ = vertical dimension of supports 35T and 35R plus $a$ for transmitter and receiver transducers within chamber of instrument
$Z$ = distance between transmitter transducer and inner wall of instrument housing
$V_s$ = acoustic velocity in instrument housing
$\theta_c$ = critical angle of reflection, defined by Snell's Law as:

$$\theta_c = \sin^{-1} \frac{V_f}{V_s}$$

---

* Ignoring the effect of the perforations 37 in the housing wall 35, which in themselves tend to make $T_{direct}$ less than $T_{ABCF}$.

The terms in Equation 2 may be rearranged as Equation 3, as follows:

*Equation 3*

$$T_{ABCF} = \frac{2L-a}{V_s} + \frac{Z(1-\tan\theta_c)+X}{V_s} + \frac{Z}{V_f \cos\theta_c}$$

For any given set of chosen values for $a$, $X$ and $Z$, $L$ can be independently chosen so that $T_{ABCF}$ is greater than $T_{direct}$ so that the acoustic pulse traveling directly through the well fluid in the instrument chamber from the transmitter to the receiver will arrive ahead of the corresponding pulse traveling via the first path ABCF.

Let the travel time for the second path DEF be expressed as $T_{DEF}$.

*Equation 4*

$$T_{DEF} = \frac{2Z}{V_f \cos\theta_c} + \frac{X - 2Z\tan\theta_c}{V_s}$$

Rearranging the terms of Equation 4 as

*Equation 5*

$$T_{DEF} = \frac{X}{V_s} + \frac{2Z}{V_f \cos\theta_c} - \frac{2Z \tan\theta_c}{V_s}$$

Using Snell's law:

$$\sin\theta_c = \frac{V_f}{V_s}; \quad \cos\theta_c = \left(1 - \frac{V_f^2}{V_s^2}\right)^{1/2}$$

$$\tan\theta_c = \frac{V_f}{V_s\left(1 - \frac{V_f^2}{V_s^2}\right)^{1/2}}$$

The time $T_{DEF}$ can be written as

*Equation 6*

$$T_{DEF} = \frac{X}{V_s} + \frac{2Z}{V_f V_s}(V_s^2 - V_f^2)^{1/2}$$

By a proper choice of values for $X$ and $Z$, $T_{DEF}$ can be greater than $T_{direct}$.

In accordance with the present invention it has been determined that a suitable logging apparatus according to the principles thereof, involving a dimensional arrangement wherein the direct pulse from the transmitter to the receiver transducer $T_{direct}$ should arrive about 10% earlier than any other pulses, including those pulses through the sonde over the paths referred to above as the first path $T_{ABCF}$ and the second path $T_{DEF}$. A preferred embodiment of the invention in accordance with this dimensional characteristic involves an instrument or sonde having an inside diameter of 2½ inches, having transmitter and receiver transducers of ½ inch in diameter and a thickness, shown as the vertical dimension in the drawing, of 0.20 inch and wherein the transmitter to receiver transducer separation, designated X in the drawing, is 2.08 inches and wherein the length of the transmitter and receiver mounting structures plus transducers, designated L in the drawings, are each 2.89 inches.

The principles hereinabove set forth may be applied to the design of a suitable logging instrument of other dimensions than those given in the foregoing example.

The preferred minimum 10% earlier arrival time of pulses over the $T_{direct}$ path as compared to the $T_{ABCF}$ path and the $T_{DEF}$ path may be mathematically expressed as given below in Equations 7 and 8 as follows:

*Equation 7*

$$T_{ABCF} = 1.1 T_{direct}$$

*Equation 8*

$$T_{DEF} = 1.1 T_{direct}$$

The distance between the transmitter transducer and the outer wall of the instrument housing, designated Z in the drawing and equations, is fixed by the dimensions of the logging sonde which, in turn, is limited by the size of the borehole to be logged. A typical maximum inside diameter for the logging sonde is 2½ inches, as given in the preferred example above. The diameter of the transmitter and receiver transducers likewise control the value of Z and the ½ inch diameter transducers given in the preferred example represent a practical value, consistent with transducers having adequate power handling capabilities.

Thus, the dimension of the distance Z between the transmitting and receiving transducers and the inside wall of the sonde is given as one-half the inside diameter of the sonde minus the diameter, i.e., horizontal dimension of the transmitter and receiver transducers. For the practical situation therefore $$Z = \frac{2\frac{1}{2} - \frac{1}{2}}{2} = 1 \text{ inch}$$

Substituting the values for $T_{direct}$ given in Equation 1 and the values given for $T_{DEF}$ in Equation 6 for the values given in Equation 8 and rewriting as Equation 9 as follows:

*Equation 9*

$$\frac{X}{V_s} + \frac{2Z}{V_f V_s}(V_s^2 - V_f^2)^{1/2} = N\frac{X}{V_f}$$

where $$N = \frac{T_{DEF}}{T_{direct}}$$

Solving for $X$ in Equation 9 gives Equation 10 as follows:

*Equation 10*

$$X = \frac{2Z(V_s^2 - V_f^2)^{1/2}}{NV_s - V_f}$$

Substituting $Z=1$ inch. $V_s = 20,000$ ft./sec. (velocity of acoustic pulse in steel housing) and $Vf = 3,000$ ft./sec. (velocity of acoustic pulse in fluid) in Equation 10 to arrive at Equation 11 as follows:

*Equation 11*

$$X = \frac{2(1)[(20,000)^2 - (3,000)^2]^{1/2}}{N(20,000) - (3,000)} = \frac{2(19,774)}{N20,000 - 3,000}$$

For $N=1.1$ according to Equation 8

$$X = \frac{39,548}{22,000 - 3,000} = 2.08 \text{ inches}$$

Having calculated a satisfactory value for X, L can be determined by substituting in Equation 7, the values given in Equations 1 and 3, to give Equation 12 as follows:

*Equation 12*

$$N\frac{X}{V_f} = \frac{2L-a}{V_s} + \frac{Z(1-\tan\theta_c)}{V_s} + \frac{X}{V_s} + \frac{Z}{V_f \cos\theta_c}$$

Rewriting Equation 12 as Equation 13 to solve for L as follows:

*Equation 13*

$$L = \frac{1}{2}\left[NX \cdot \frac{V_s}{V_f} + a - Z(1-\tan\theta_c) - X - Z\frac{V_s}{V_f \cos\theta_c}\right]$$

Substitute the known values into Equation 13 to give Equation 14 as follows:

*Equation 14*

$$L = \frac{1}{2}[1.1\ (2.08)\ (6.67) + 0.20 - (1)(1 - .1518) \\ - 2.08 - 1(6.67)(1/.9887)]$$

Completing the solution to give Equation 15 as follows:

*Equation 15*

$$L = \frac{1}{2}[15.26 + 0.20 - .8482 - 2.08 - 6.746] = 2.89 \text{ inches}$$

In like manner the exact dimensions according to the principles of this invention may be determined for sondes of somewhat different diameter and for sondes including transducers of different dimension.

Obviously many modifications and variations of the invention, as hereinbefore set forth, may be made without departing from the spirit and scope thereof, and therefore only such limitations should be imposed as are indicated in the appended claims.

We claim:

1. The method of logging fluids having different acoustic properties contained in a borehole which comprises producing acoustic energy in the form of acoustic pulses at a first point in said fluids, selectively detecting a first portion of said acoustic energy to arrive at a second point in said fluids, said second point being so spaced from said first point that the direct path through said fluid between said first and second points is the shortest acoustic path between said first and second points whereby said portion of energy of said acoustic energy detected at said second point is that which has passed through the borehole fluids in a direct path between said first and second points and is the first energy of said acoustic energy to arrive at said second point, said portion of acoustic energy selectively detected at said second point comprising the first pulse to arrive at said second point following the production of a given one of said acoustic pulses at said first point to the substantial exclusion of succeeding acoustic energy arriving at said second point from said first point over paths other than said direct path measuring the interval of time during which said portion of acoustic energy travels from said first point to said second point and correlating said measurement with the depth to said points in the borehole.

2. The method described in claim 1 in which said measurements are made continuously throughout at least a portion of the vertical dimension of the well.

3. Apparatus for logging fluids having different acoustic properties contained in the bore of a well which comprises a tool housing, a conductor cable from which said housing is suspended in the well, means operatively associated with said cable for measuring the amount of cable payed out and thus the depth of the housing in the well, means disposed in said housing for producing acoustic energy in the form of acoustic pulses, detecting means disposed in said housing at a fixed distance less than the diameter of the bore of the well from said acoustic energy producing means to receive a portion of said acoustic energy, said housing having a portion thereof intermediate said energy producing means and said energy receiving means providing a chamber open to the well fluids, said fixed distance between said acoustic energy producing means and said acoustic detecting means being a direct path through said well fluid in said chamber and being the shortest acoustical path from said energy producing means to said detecting means, selective pulse interval time measuring means operatively coupled to said acoustic energy producing means and said acoustic energy detecting means for selectively detecting said first portion of energy to arrive at said energy receiving means to the substantial exclusion of subsequent portions of said energy arriving over other than said direct path and determining the interval of time during which said portion of acoustic energy travels from said acoustic energy producing means to said acoustic energy detecting means, and display means operatively coupled to said time measuring means for providing a signal indicative of the time interval determined for travel of said portion of acoustic energy from said producing means to said detecting means in correlation with the depth of the housing in the well determined by said means for measuring the depth of the housing.

4. An acoustical well logging system comprising a housing having a portion thereof open to fluids contained in a well, a pair of spaced transducer elements disposed in the chamber in contact with said well fluids such that they are effectively acoustically insulated from said housing, the distance between said elements being substantially less than the diameter of the bore of the well, said distance between said elements being a direct path through said well fluids which is the shortest acoustical path between said elements, pulse applying means coupled to one of said transducers for applying an electric pulse to one of said transducer elements for producing an acoustic pulse, means coupled to the other of said spaced transducer elements and to said electric pulse applying means for selectively measuring the time interval during which said acoustic pulse travels over said direct path between said transducer elements through said well fluids to the substantial exclusion of other acoustic energy traveling between said transducer elements from one to the other and subsequently arriving at said other element from said one element over paths other than said direct path through said well fluids and means coupled to said measuring means for providing an indication of the time interval measurement in correlation with the depth to said transducer elements in the well.

5. In apparatus for logging fluids in a borehole comprising an elongated housing adapted to be passed through said borehole fluids and having associated therewith means for determining the location of said housing in said borehole, the improvement comprising the combination of means disposed in said housing for producing an acoustic pulse, means disposed in said housing at a fixed distance from said acoustic pulse producing means to receive said acoustic pulse, said fixed distance being less than the diameter of the borehole, said housing having a portion thereof intermediate said pulse producing means and said pulse receiving means providing a chamber adapted to receive the fluids from the borehole said fixed distance between said pulse producing means and said acoustic pulse receiving means being a direct path through said fluids in said chamber and being the shortest acoustical path from said pulse producing means to said pulse receiving means, and means operatively coupled to said acoustic pulse producing means and to said acoustic pulse receiving means for selectively detecting the first energy to arrive at said receiving means over said direct path from said transmitting means to the substantial exclusion of subsequent acoustic energy thereafter arriving at said receiving means over other than said direct path determining the interval of time during which said pulse travels over said direct path from said acoustic pulse producing means to said acoustic pulse receiving means.

6. Logging apparatus for determining the nature of fluids contained in a bore hole traversing subsurface earth formations which comprises an instrument adapted to be passed through the borehole and means for determining the position of the instrument in the borehole, said instrument including a first acoustic transducer for producing acoustic energy comprising an acoustic pulse at a first point in the fluid in the well, a second transducer positioned a predetermined distance from said first transducer for detecting a portion of the acoustic energy comprising said acoustic pulse produced at said first point and transmitted through a sample of the well fluid thereto, said second point being so spaced from said first point that the direct path from said first point to said second point through said sample of said well fluid is the shortest acoustical path from said first point to said second point whereby said portion of energy is the portion of said energy which is first to arrive at said second point is that which passes through the borehole fluids in a direct path between said first and second transducers and is the first portion of the acoustic energy produced in the first transducer to arrive at said second point, selective time interval measuring means responsive to the transmission of energy by said first transducer and selectively responsive to the receipt of said first portion of said energy by said second transducer to the substantial exclusion of subsequent acoustic energy arriving at said second transducer from said first transducer over paths other than said direct path through said sample of said well fluid for developing a signal proportional to the time interval between the transmission of energy by said first transducer and the receipt of the first energy to arrive at said second transducer from said first transducer, and display means operatively coupled to said time interval measuring means for providing a signal indication of said time interval in correlation with the position of the logging instrument in the borehole.

7. Apparatus as set forth in claim 6 wherein said time interval measuring means is means for continuously measuring the time interval throughout at least a portion of the vertical dimension of the well.

8. The method of logging fluids in a borehole to determine a characteristic thereof proportional to the acoustic velocity transmission characteristic of said fluid which comprises emitting acoustic energy at different locations along the borehole and logging at a fixed distance from the source of said acoustic energy the time interval required for the transmission of that portion of said energy which is transmitted directly through a portion of the well fluid and which is the first portion of said acoustic energy to travel said fixed distance through said well fluid to the substantial exclusion of other portions of said energy following different paths in the borehole.

9. A system for logging fluids in a borehole traversing earth formations comprising a logging instrument adapted to be passed through the borehole and means for determining the location of said instrument in the borehole, said instrument including a chamber having access means for receiving therein borehole fluid at various locations in the borehole, said instrument including acoustic transmitting and receiving transducers, said transducers being mounted within the instrument in such manner as to provide acoustic contact with a sample of well fluid in said chamber, said transmittng and receving transducers being spaced from one another a predetermined distance defining a direct travel path from the transmitting transducer to the receiving transducer through the well fluid in said chamber, said transducers being spaced from the walls of said chamber a sufficient distance so that the acoustic travel path from the transmitting transducer to the receiving transducer through the well fluid in said chamber is significantly shorter than the acoustic travel path from the transmitting transducer to the receiving transducer through other travel paths including the walls defining said chamber, and time-selective means responsive to the operation of said transmitting and receiving transducers for determining the interval of time during which an acoustic pulse travels from said transmitting transducer over said direct travel path through said well fluid in said chamber to said receiving transducer to the substantial exclusion of acoustic energy subsequently arriving at said receiving transducer over travel paths other than said direct travel path.

10. Logging apparatus for determining the nature of fluids contained in a borehole traversing subsurface earth formations which comprises an instrument adapted to be passed through the borehole and means for determining the position of the instrument in the borehole, said instrument including a first acoustic transducer for producing acoustic energy at a first point in the fluid in the well, a second transducer positioned a predetermined distance from said first transducer for detecting a portion of the acoustic energy produced at said first point and transmitted through a sample of the well fluid thereto, said second point being so spaced from said first point and said two points being so spaced from the structure of said instrument that said portion of energy detected at said second point is that which passes through the borehole fluids in a direct path between said first and second transducers and is the first portion of the acoustic energy produced in the first transducer to arrive at said second point, measuring means responsive to the transmission of energy by said first transducer and selectively responsive to the receipt of the first portion of said acoustic energy detected by said second transducer following the production of a given portion of acoustic energy by said first transducer for developing a signal proportional to the time interval between the transmission of said first portion of energy by said first transducer and the receipt of said first portion of energy by said second transducer, comparison means operatively coupled to said measuring means and responsive to said signal developed thereby, said comparison means comprising a reference source and means for comparing said signal developed by said measuring means with said reference source, and display means operatively coupled to said comparison means for providing a signal indication of said time interval in correlation with the position of the logging instrument in the borehole.

11. Apparatus as defined in claim 6 wherein said selective time interval measuring means comprises time selective means for selectively displaying a signal indicative of the signal resulting from receipt of acoustic energy by said second transducer only during a predetermined portion of time following transmission of acoustic energy by said first transducer.

12. Apparatus as defined in claim 11 wherein said time selective means comprises gating means for selectively coupling the signal from said time interval measuring means to said display means.

13. Apparatus as defined in claim 12 wherein said gating means comprises a comparator for comparing the signal developed by said time interval measuring means with a predetermined reference source and a synchronizer coupled to said comparator for rendering the comparator periodically operative only during the predetermined portion of time following transmission of acoustic energy by said first transducer when acoustic energy is expected to be received through the well fluid in a direct path from said first transducer to said second transducer.

References Cited in the file of this patent

UNITED STATES PATENTS

| | | |
|---|---|---|
| 2,275,736 | Cloud | Mar. 10, 1942 |
| 2,283,429 | Ennis | May 19, 1942 |
| 2,573,390 | Blanchard | Oct. 30, 1951 |
| 2,704,364 | Summers | Mar. 15, 1955 |
| 2,756,404 | Anderson et al. | July 24, 1956 |